July 16, 1929.  M. R. HULL  1,720,790
AUTOMOBILE BODY
Filed Aug. 31, 1926
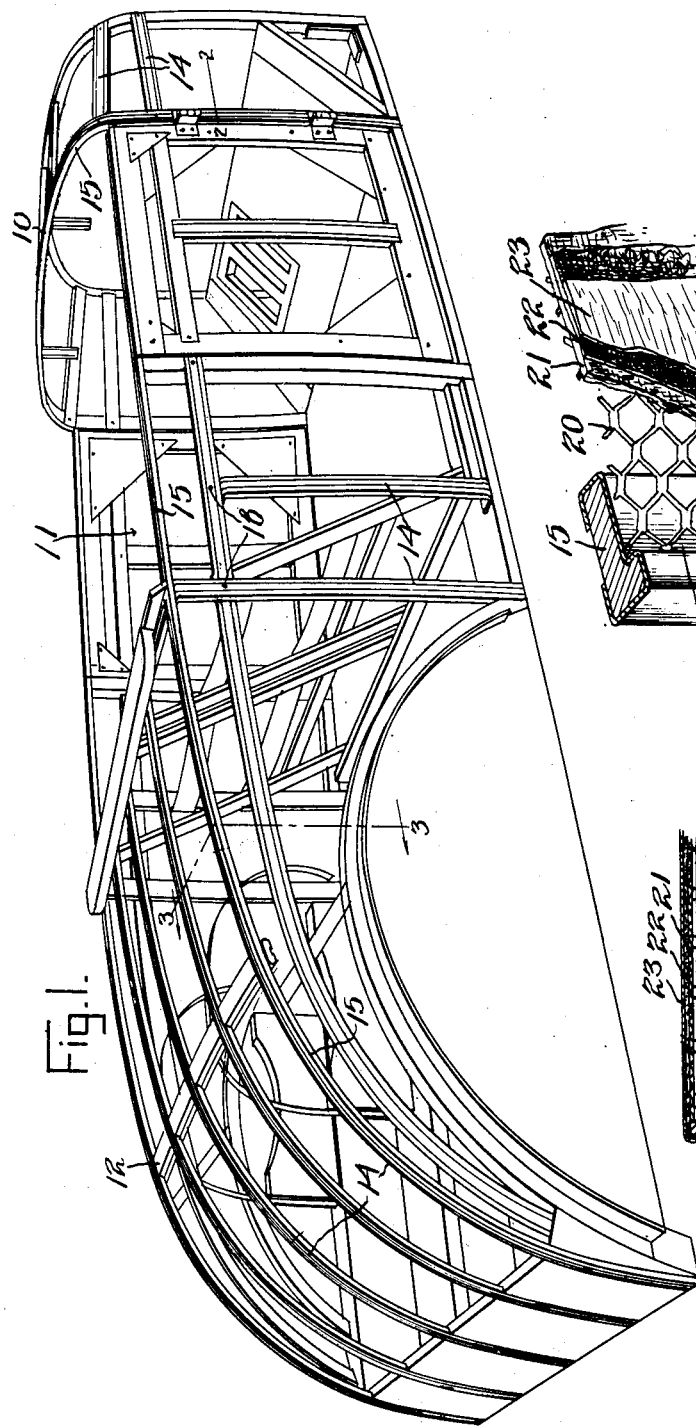
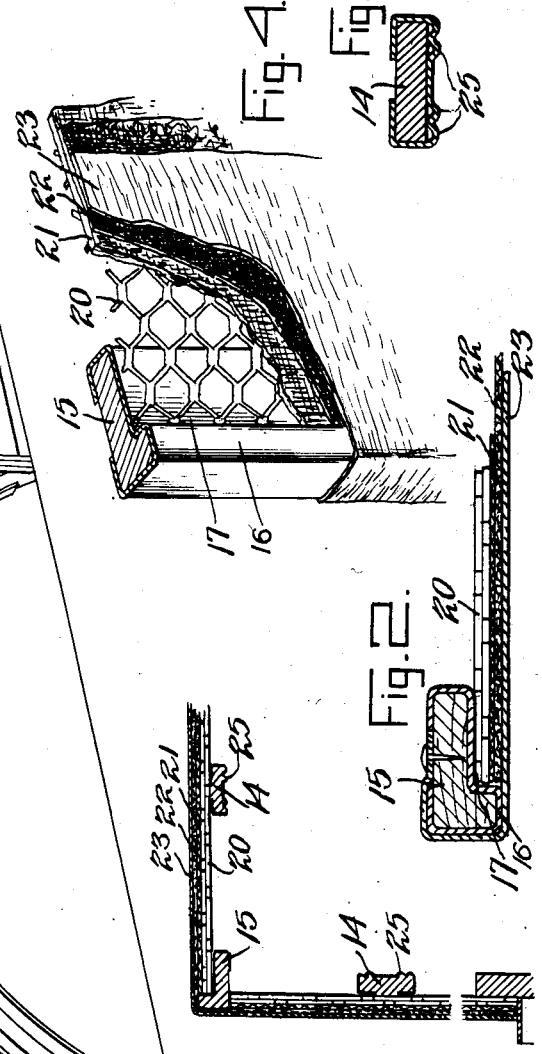
Inventor
Matthew R. Hull
By
E. W. Bedford
Attorney

Patented July 16, 1929.  1,720,790

UNITED STATES PATENT OFFICE.

MATTHEW R. HULL, OF CONNERSVILLE, INDIANA, ASSIGNOR TO REX MANUFACTURING COMPANY, OF CONNERSVILLE, INDIANA, A CORPORATION OF INDIANA.

AUTOMOBILE BODY.

Application filed August 31, 1926. Serial No. 132,785.

A common construction of automobile bodies comprises a framework of heavy lumber glued up in shape to follow the curves and outside shape of the finished body, requiring the use of numerous milling forms and jigs, with a resultant objection due to excessive weight and lack or resiliency in the framework in order to provide such a structure that will avoid cracking and breaking under the strain to which it is subjected by the twisting and torsion of the chassis or running gear of the vehicle. Such construction is not only objectionable because of its undue weight and the consequent excessive strain and wear imposed upon the chassis, running gear and tires but, is likewise unduly expensive.

The object of my said invention is, therefore, to provide a construction of bodies for vehicles, particularly automobiles, which while of great strength and durability will be light and flexible, eliminating all unnecessary weight while providing the required strength and resisting qualities, whereby the wear and tear upon the chassis, tires and other parts of a car incident to the carrying of a heavy rigid body are largely eliminated and longer life is insured to the car with a considerable saving in weight and cost of construction, all as will be hereinafter more fully described and claimed.

Referring to the accompanying drawings which are made a part hereof and on which similar reference characters indicate similar parts, Figure 1 is a perspective view of the framework of an automobile body with the covering fabric left off, Figure 2, a detail section on the line 2—2 of Figure 1, Figure 3, a detail section on the line 3—3 of Figure 1, Figure 4, a detail sectional perspective, and Figure 5, a detail section of a filler strip.

In the drawings, (Figure 1), is shown the body of a roadster comprising the cowl 10, cockpit 11 and tonneau 12 constructed of members composed of flexible sheet metal, preferably steel channels, filled with wood or other suitable fibrous material to provide a tacking strip as well as lend stiffness and strength to the member, which produces a very strong though non-rigid construction. The members 14 are of the design shown in detail in Figure 5 which are flat strips bent to the shape desired and used as intermediate supports or fillers, and preferably formed with stiffening ribs 25. The members 15 (shown in detail in Figures 2, 3, and 4) constitute end members and are provided with a raised edge 16 forming a depression 17 to be more fully explained. The various members 14 and 15 are assembled and secured together by rivets 18 to form the skeleton framework which then is first covered with a layer of sheet steel lath 20. As there is a certain amount of give and spring to this material, it acts as a shock absorber when any undue stress is brought to bear on a particular part of the body and instead of confining the shock to any particular part, as is done in the case of solid wood or metal, it distributes the impact over a much larger area. The steel lath 20 is cut to the proper shape or pattern and secured to the intermediate members 14 by tacks and the edge rests in the depression 17 of the end members 15 and are secured thereto by tacks. The rought sharp edges of the steel lath or ends of its parts, abut against the ledge formed in the face of members 15, and thus protect the cover against liability of injury from said ends. Over the lath is then stretched a sheet of heavy duck 21 forming a smooth surface which is in turn covered with a layer of cotton wadding 22 which not only acts as a padding but also is a deadener for sound and an insulator against heat and cold. The whole body thus formed is covered with a strong water-proof fabric 23 with its outer surface finished in any desired color. Said fabric is drawn tightly over the ledge 17 of the outside members 15 and tacked to the underside of said members thus forming a smooth outer surface with rigid, smooth and neatly finished corners, the other parts of the covering consisting of the steel lath 20, the sheet of duck 21 and the layer of cotton wadding 22 filling the recesses in the outside members 15 to the plane of the outer edge of the ledge 17 so that while a light, flexible and comparatively inexpensive covering is provided the corners, or parts where the body is likely to come in contact with blows and where rigidity is required are made solid, but at the same time neat and attractive in appearance.

Figure 2 represents a sectional view through the covering materials and one of the end members 15 in which the lath 20, the heavy duck 21 and the wadding 22 are shown in the depression adjacent the ledge 17 while the outer fabric 23 is carried around the end member, past the edge 16 to the side opposite the depression where it is securely tacked forming a neatly finished edge.

In this construction, the covering is sectional, i. e. the cowl, the doors, the rear panels of the tonneau and the deck are separate panels which can be replaced if damaged without disturbing any of the adjacent panels.

By the construction described, as will be readily understood, great strength is secured while providing for desired flexibility and yielding between the parts without such jar or strain as will contribute injury to the construction, or the runninig gear or other parts of the car or other vehicle or carrier. A light body, such as thus provided, also contributes to safety inasmuch as it reduces weight above the motor enabling a lighter sub-structure to carry the super-structure with greater safety and stability.

Moreover a construction of body is provided which can be shaped to suit different requirements and tastes more conveniently and with much less expense than required by the usual body constructions.

It will be understood, of course, that the particular style of body shown is only for the purposes of illustration and that my invention is intended to apply to the construction of bodies of all styles and types, closed as well as open, not only for automobiles but for other bodies in which the characteristics of this body are desirable, as, for example, aeroplane bodies, in which lightness and strength combined are very important. I, therefore, do not wish to be understood as limiting the scope of my said invention except as required by the claims.

Having thus fully described my said invention, what I claim as new and desire to secure by Letters Patent, is:

1. A vehicle body comprising a framework of channel metal members filled with fibrous material, the intermediate members being formed with flat surfaces and the corner or end members with a ledge at their outer edges, and a covering composed of various fabrics of a thickness adapted to abut against the ledge of said corner members and fill the recesses in said members formed by said ledge, and the outer fabric of the covering being adapted to extend over said ledge to form a smooth cover, substantially as set forth.

2. A vehicle body comprising a framework composed of hollow metal members with fibrous material encased therein the corner members being formed with raised ledges, and a covering consisting of several fabrics of different materials mounted over said framework with the edges of the covering except the outside fabric lying within the ledges of said corner members, and said outside fabric extending over said ledges around said corners to form a smooth corner, substantially as set forth.

In witness whereof, I have hereunto set my hand at Connersville, Indiana, this 27th day of August, A. D. nineteen hundred and twenty-six.

MATTHEW R. HULL.